Patented May 31, 1949

2,471,829

UNITED STATES PATENT OFFICE 2,471,829

HYDROCARBONOXYBIS TRIFLUORO-METHYL BENZENES

Earl T. McBee, Robert O. Bolt, and Robert Tebbe, La Fayette, Ind., assignors to Purdue Research Foundation, La Fayette, Ind., a corporation of Indiana No Drawing. Application January 8, 1946, Serial No. 639,906

15 Claims. (Cl. 260—612)

This invention relates to a novel group of compounds constituted by the hydrocarbonoxybis-(trifluoromethyl)benzenes and to a process for the preparation thereof.

The members of this new group of compounds may be prepared by the reaction of a nuclearly halogenated, i. e., ring-brominated, chlorinated, or fluorinated, bis(trifluoromethyl)benzene and an alkali metal alcoholate or phenolate in a suitable anhydrous alcoholic or phenolic medium. In some instances it may not be necessary to employ the alcoholate or phenolate, it being possible to react the ring-halogenated bis(trifluoromethyl)benzene and the selected alcohol or phenol in an alcoholic or phenolic medium having an alkali metal hydroxide as a component.

The starting materials in the reaction may be selected to permit preparation of any particular one of the series of new compounds herein concerned. For example, 4-chloro-1,3-bis(trifluoromethyl)benzene may be treated with anhydrous sodium methoxide in methanol solvent to produce 4-methoxy-1,3-bis(trifluoromethyl)benzene.

The preparation of these new compounds may be accomplished by reacting the aforementioned starting materials in a steel autoclave fitted with a heater and mechanical rocking device, or any other suitable container, e. g., a glass flask, wherein the reaction temperature may be raised to between about 40 and 225 degrees centigrade in a period of about three to six hours with constant rocking or stirring throughout the reaction period. The preferred temperature range for our reaction is between about 60 and 175 degrees centigrade. Some of the compounds may be more easily prepared than others, due to varying solubilities and reactivities of the respective alcoholates, phenolates, alcohols, phenols, or bis(trifluoromethyl)halobenzenes, and the reaction conditions may be varied accordingly. The product may be washed with dilute hydrochloric acid to neutralize any excess alkali metal alcoholate or phenolate; the organic layer may be separated and washed with water, and any aqueous layers may be extracted with chloroform. The extracts and the organic layer may then be combined, dried, and rectified to yield the desired hydrocarbonoxybis(trifluoromethyl)benzene. Other methods of separation may be used and will be apparent to one versed in the art.

The following examples illustrate methods by which members of this new group of compounds may be prepared, but are not to be construed as limiting the invention thereto.

Example 1

The purification of meta-xylene according to a procedure outlined by Clarke and Taylor (J. A. C. S. 45, 830–33, (1923)) was accomplished in the following manner: Isomeric xylenes were removed from technical meta-xylene by boiling with dilute nitric acid; the unoxidized product was sulfonated to form xylene-sulfonic acid; and pure meta-xylene was separated therefrom by steam distillation. Pure meta-xylene, boiling at 138° to 139° centigrade, was obtained.

One hundred six grams (1 mole) of pure meta-xylene was treated with 73 grams of gaseous chlorine in the liquid phase in the presence of 1 gram of ferric chloride catalyst. The temperature was maintained between about 40 to 50 degrees centigrade during the reaction. The product resulting from this chlorination was rectified and the fraction boiling at about 89 degrees centigrade at 24 millimeters of mercury pressure absolute was collected. This gave 123 grams, 87 per cent yield and conversion, of 4-chloro-meta-xylene. Proof of structure of this compound was obtained by dichromate oxidation to produce 4-chloro-meta-toluic acid, melting at 202 to 204 degrees centigrade.

One hundred twenty-three grams of 4-chloro-meta-xylene, prepared as above, was photochemically chlorinated with gaseous chlorine. The liquid was placed in a 68 millimeter glass chlorination tube, illuminated with six 200-watt incandescent light bulbs, and gaseous chlorine was continuously passed into the reaction mixture through a gas dispersion disc over a period of forty-eight hours. During this time the temperature was allowed to rise gradually from about 30 degrees centigrade to about 150 degrees centigrade and controlled by means of internal cooling coils and resistance wire wound around the lower part of the tube. After the reaction had gone to completion, the product was aerated prior to purification by vacuum distillation. Three hundred and two grams of substantially pure 4-chloro-1,3-bis(trichloromethyl)benzene, boiling at 170 to 180 degrees centigrade at 6 millimeters of mercury pressure absolute, was obtained, representing a 97.8 per cent yield and conversion.

The substitution of fluorine for chlorine in the side chains was accomplished in the following manner: Three hundred and two grams of 4-chloro-1,3-bis(trichloromethyl)benzene and 20 grams of antimony pentachloride were placed in a two-gallon nickel autoclave and hydrogen fluoride was allowed to pass into the mixture for about forty-eight hours, 380 grams of hydrogen fluoride being introduced during that period at a temperature of about 70 to 80 degrees centigrade. The reaction product, after purification by steam distillation and rectification, weighed 137.9 grams, representing a conversion and yield of 4-chloro-1,3-bis(trifluoromethyl)benzene of 88 per cent. An unreacted residue of 95 grams was recycled to yield an additional quantity of product.

Example 2

A mixture of two hundred and forty-eight grams of 4-chloro-1,3-bis(trifluoromethyl)benzene, fifty-four grams of anhydrous sodium methoxide, and three hundred milliliters of methanol was refluxed for twelve hours. The alcoholic solution was diluted with a large volume of water to cause the liquid reaction product to separate into two layers. The organic layer was separated and washed several times with dilute sulfuric acid and with water prior to being dried over calcium chloride. Rectification yielded a fraction boiling at 86–86.5 degrees centigrade at 27 millimeters of mercury pressure absolute. Molecular weight determination and fluorine analysis proved the compound to be 4-methoxy-1,3-bis(trifluoromethyl)benzene.

Example 3

4-ethoxy-1,3-bis(trifluoromethyl)benzene was produced by substituting sodium ethoxide for sodium methoxide and ethyl alcohol for methyl alcohol in the procedure outlined in Example 2.

Example 4 n-Propyl alcohol, 4-chloro-1,3-bis(trifluoromethyl)benzene and sodium propoxide were placed in an autoclave fitted with a mechanical rocker and heated to 160 degrees centigrade over a period of about 4 hours. At the end of this time the autoclave was allowed to cool and the reaction product was poured into dilute acid, where an organic layer separated. Aqueous layers were extracted with chloroform and the extracts were combined with the organic layer. The combined organic product was washed with water, dried over anhydrous calcium sulfate and rectified to yield 4-n-propoxy-1,3-bis(trifluoromethyl)benzene. In this case it was found advantageous to prepare the sodium alcoholate under anhydrous conditions by the reaction between the alcohol and metallic sodium, inasmuch as hydrolysis was found to occur during the reaction if substantially anhydrous conditions were not employed.

Example 5

In a manner similar to the above, 4-isopropoxy-1,3-bis(trifluoromethyl)benzene was prepared from a mixture of 4-chloro-1,3-bis(trifluoromethyl)benzene and sodium isopropoxide in an isopropanol medium, with heating to 160 degrees centigrade over a period of about 4 hours in a rocking autoclave. After cooling, the reaction mixture was elutriated with dilute acid and the organic layer separated by pouring into water. Chloroform was used to extract the aqueous layers, and the extract was combined with the organic product. After washing and drying over anhydrous calcium sulfate, the combined product was rectified, yielding 4-isopropoxy-1,3-bis(trifluoromethyl)benzene.

Example 6

One hundred grams of 4-chloro-1,3-bis(trifluoromethyl)benzene and 156 grams of sodium benzyloxide were dissolved in a large excess of benzyl alcohol and refluxed for eight hours. The reaction mixture was then cooled, poured into water containing sufficient sulfuric acid to make the resulting mixture acid to litmus, and the organic layer was separated therefrom. Chloroform extracts of the wash water were combined with the organic layer, dried over anhydrous calcium sulfate and vacuum rectified. A 48.3 per cent yield and conversion of 4-benzyloxy-1,3-bis(trifluoromethyl)benzene was obtained.

Example 7

Three hundred grams of sodium cyclohexoxide, suspended in a mixture of 400 milliliters of dioxan, and 200 milliliters of cyclohexanol was admixed with 186 grams of 4-chloro-1,3-bis(trifluoromethyl)benzene in a one-liter rocking autoclave. Over a period of five hours the temperature was raised to 160 degrees centigrade and allowed to return to room temperature, whereafter the reaction mixture was poured into a dilute sulfuric acid solution and the organic layer was separated and washed. Wash waters were extracted with benzene and the extracts were combined with the organic product. Rectification yielded 4-cyclohexoxy-1,3-bis(trifluoromethyl)benzene.

Example 8

A mixture of 208 grams of n-octyl alcohol, 500 milliliters of dioxan and 32 grams of sodium was refluxed until reaction ceased. The resulting suspension of sodium octoxide in dioxan was transferred to a one-liter iron autoclave and 186 grams of 4-chloro-1,3-bis(trifluoromethyl)benzene was added thereto. The mixture was heated to 160 degrees centigrade over a period of about six hours and then cooled slowly, the reaction product being recovered by pouring the mixture into dilute sulfuric acid and separating the organic layer. This layer was washed with water, separated, combined with chloroform extracts of the wash water, dried over anhydrous calcium sulfate, and rectified to yield 127 grams of 4-n-octoxy-1,3-bis(trifluoromethyl)benzene, boiling at 135–137 degrees centigrade at 6 millimeters of mercury pressure absolute. This product corresponds to a 48.8 per cent conversion and yield of the desired ether.

Example 9

Eighty-one grams of 2-chloro-1,4-bis(trifluoromethyl)benzene, prepared by a manner analogous to the chlorination and fluorination procedures outlined in Example 1, 300 milliliters of methanol and 42 grams of sodium hydroxide were placed in an iron autoclave and maintained at a temperature of 160 degrees centigrade over a period of about six hours with constant rocking. After treating the product as described in the previous example, a conversion of 8.75 per cent and a yield of 19.2 per cent of 2-methoxy-1,4-bis(trifluoromethyl)benzene were obtained from the reaction product.

Example 10

One hundred and twelve grams of 5-chloro-1,3-bis(trifluoromethyl)benzene, 68 grams of sodium ethoxide and 400 milliliters of absolue ethanol were placed in a one-liter iron autoclave, heated at 165 degrees centigrade for about six hours with constant rocking, and then allowed to cool to room temperature. The products of the reaction were poured into dilute sulfuric acid and the organic layer separated. This layer was washed with water several times, wash solutions being extracted with benzene and the extracts being combined with the organic layer prior to drying over anhydrous calcium sulfate and rectifying. A 67.9 per cent yield of 5-ethoxy-1,3-bis(trifluoromethyl)benzene was obtained, boiling between 81–82 degrees centigrade at 29 millimeters of mercury pressure absolute.

Example 11

Eighty-nine grams of 5-chloro-1,3-bis(trifluoromethyl)benzene, 300 milliliters of methanol and 44 grams of sodium methoxide were treated as in the above example at a reaction temperature of 180 degrees centigrade, 30.5 grams of the unreacted chloro-compound and 42 grams of the ether resulting. The conversion was 48 per cent and the yield of the desired 5-methoxy-1,3-bis(trifluoromethyl)benzene was 76 per cent.

Example 12

Two hundred grams of sodium phenate, 186 grams of 4-chloro-1,3-bis(trifluoromethyl)benzene, 400 grams of phenol and 1 gram of powdered copper were sealed in an iron autoclave of one-liter capacity which was mounted in a rocker. The temperature was raised to 225 degrees centigrade, then allowed to fall back to 25 degrees centigrade over a period of six hours. The reaction mixture was poured into excess sodium hydroxide solution and steam-distilled. The organic product was separated, washed, dried over anhydrous sodium sulfate, and rectified under vacuum. Ether extracts of the wash solutions were combined with the product prior to rectification. The yield was 76 grams of 4-phenoxy-1,3-bis(trifluoromethyl)benzene, boiling at 121 to 122 degrees centigrade under 14 millimeters of mercury pressure absolute.

Example 13

2-chloro-1,3-bis(trifluoromethyl)benzene was treated with sodium methoxide in the presence of excess methanol to yield 2-methoxy-1,3-bis(trifluoromethyl)benzene. The procedure used was the same as that described for the preparation of 4-methoxy-1,3-bis(trifluoromethyl)benzene.

It will be apparent from the foregoing that any of the aforementioned alcoholates may be reacted with the properly selected bis(trifluoromethyl)halobenzene to produce the corresponding hydrocarbonoxybis(trifluoromethyl)benzene. It should also be understood that the process may be conducted successfully with the employment of either bis(trifluoromethyl)bromo, chloro, or fluorobenzenes and the desired alcoholate in a suitable medium. The compounds are useful as chemical intermediates.

The following table indicates physical constants of some hydrocarbonoxybis(trifluoromethyl)benzenes, prepared in the preceding examples, and their intermediates:

We claim:

1. A hydrocarbonoxybis(trifluoromethyl)benzene having the general formula:

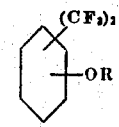

wherein R is selected from the group of radicals consisting of alkyl, cycloalkyl, aralkyl and aryl, said aryl and aralkyl radicals containing a single unsubstituted carbocyclic ring.

2. A compound having the general formula:

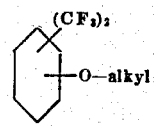

3. A compound having the general formula:

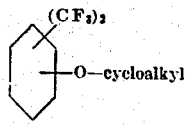

4. A 4-alkoxy-1,3-bis(trifluoromethyl)benzene.
5. 4-cyclohexoxy-1,3-bis(trifluoromethyl)benzene.
6. 4-benzyloxy-1,3-bis(trifluoromethyl)benzene.
7. 4-methoxy-1,3-bis(trifluoromethyl)benzene.
8. The process which includes: heating together a bis(trifluoromethyl)halobenzene, having only halogen and trifluoromethyl substituents on the benzene ring, and an alkali metal hydrocarbonoxide selected from the group consisting of alkoxides, cycloalkoxides, monocyclic aralkoxides, and monocyclic aryloxides, at a temperature between about 40 degrees and about 225 degrees centigrade and separating from the reaction product a hydrocarbonoxybis(trifluoromethyl)benzene.
9. The process which includes: heating together a bis(trifluoromethyl)halobenzene, having only halogen and trifluoromethyl substituents on the benzene ring, and an alkali metal alkoxide at a temperature between about 40 degrees and 225 degrees centigrade and separating from the reaction product an alkoxybis(trifluoromethyl)benzene.
10. The process which includes: heating together a bis(trifluoromethyl)halobenzene, having only halogen and trifluoromethyl substituents on the benzene ring, and an alkali metal cycloalkoxide at a temperature between about 40 degrees and 225 degrees centigrade and separating from

| Compound | Percent F Theor. | Percent F Found | B. P., °C | M. P., °C | Sp. G., 20/4 | Ref. Index |
|---|---|---|---|---|---|---|
| 4-methoxy-1,3-(CF₃)₂-benzene | 47.1 | 47.2 | 173 | 4 to 5 | 1.4507 | 1.4170 |
| 4-ethoxy-1,3-(CF₃)₂-benzene | 44.3 | 44.5 | 185 | | 1.3559 | 1.4130 |
| 4-n-propoxy-1,3-(CF₃)₂-benzene | 42.0 | 41.8 | 200 | | 1.3101 | 1.4162 |
| 4-isopropoxy-1,3-(CF₃)₂-benzene | 42.0 | 42.3 | 192 | | 1.2958 | 1.4128 |
| 4-cyclohexoxy-1,3-(CF₃)₂-benzene | 36.5 | 34.4 | 255 | | 1.2497 | 1.4523 |
| 4-benzoxy-1,3-(CF₃)₂-benzene | 35.6 | 33.1 | 275–277 | | 1.3454 | 1.4887 |
| 4-octoxy-1,3-(CF₃)₂-benzene | 33.3 | 33.4 | 278 | | 1.1705 | 1.4304 |
| 4-phenoxy-1,3-(CF₃)₂-benzene | 37.3 | 38.2 | 244 | glass −25 | 1.3777 | 1.4756 |
| 5-methoxy-1,3-(CF₃)₂-benzene | 47.1 | 47.5 | 160.5 | 2 to 3 | 1.4192 | 1.4064 |
| 5-ethoxy-1,3-(CF₃)₂-benzene | | | 81–82 at 29 mm. Hg. | | | |
| 2-methoxy-1,3-(CF₃)₂-benzene | | | 81.0–83.0 at 29 mm.Hg. | | | |
| 2-methoxy-1,4-(CF₃)₂-benzene | 47.1 | 45.7 | 163.5 | 26.5–27.5 | 1.4110 | 1.4150 |
| 2-chloro-1,3-(CF₃)₂-benzene | | | 154–158 | | | |
| 2-chloro-1,4-(CF₃)₂-benzene | | | 147 | −13 to −12 | 1.5112 | 1.4135 |
| 4-chloro-1,3-(CF₃)₂-benzene | | | 148 at 741 mm. Hg | | 1.5201 | 1.4150 |
| 5-chloro-1,3-(CF₃)₂-benzene | | | 138–140 | | | | the reaction product a cycloalkoxybis(trifluoromethyl)benzene.

11. The process which includes: heating together a bis(trifluoromethyl)halobenzene, having only halogen and trifluoromethyl substituents on the benzene ring, and an alkali metal monocyclic aryloxide at a temperature between about 40 degrees and 225 degrees centigrade and separating from the reaction product an aryloxybis(trifluoromethyl)benzene.

12. The process which includes: heating together a bis(trifluoromethyl)chlorobenzene, having only halogen and trifluoromethyl substituents on the benzene ring, and an alkali metal alkoxide at a temperature between about 40 degrees and 225 degrees centigrade and separating from the reaction product an alkoxybis(trifluoromethyl)-benzene.

13. The process which includes: heating together a bis(trifluoromethyl)chlorobenzene, having only halogen and trifluoromethyl substituents on the benzene ring, and an alkali metal cycloalkoxide at a temperature between about 40 degrees and 225 degrees centigrade and separating from the reaction product a cycloalkoxybis(trifluoromethyl)benzene.

14. The process which includes: heating together a bis(trifluoromethyl)chlorobenzene, having only halogen and trifluoromethyl substituents on the benzene ring, and an alkali metal monocyclic aryloxide at a temperature between about 40 degrees and 225 degrees centigrade and separating from the reaction product an aryloxybis(trifluoromethyl)benzene.

15. The process as claimed in claim 8 wherein the reaction temperature is maintained between about 60 and 175 degrees centigrade.

EARL T. McBEE.
ROBERT O. BOLT.
ROBERT TEBBE.

REFERENCES CITED

The following references are of record in the file of this patent:

UNITED STATES PATENTS

| Number | Name | Date |
|---|---|---|
| 2,072,797 | Clark et al. | Mar. 2, 1937 |
| 2,336,921 | Benning | Dec. 14, 1943 |

OTHER REFERENCES

Petitcolas, A. P. C. specification Ser. No. 304,859, published June 15, 1943.